(No Model.)

S. MOORE.
FENCE WIRE REEL.

No. 466,179. Patented Dec. 29, 1891.

WITNESSES:
Donn Twitchell
C. Sedgwick

INVENTOR:
S. Moore
BY Munn & Co.
ATTORNEYS

UNITED STATES PATENT OFFICE.

SYLVESTER MOORE, OF AUDUBON, IOWA.

FENCE-WIRE REEL.

SPECIFICATION forming part of Letters Patent No. 466,179, dated December 29, 1891.

Application filed May 1, 1890. Serial No. 350,212. (No model.)

*To all whom it may concern:*

Be it known that I, SYLVESTER MOORE, of Audubon, in the county of Audubon and State of Iowa, have invented a new and Improved Fence-Wire Reel, of which the following is a full, clear, and exact description.

My invention relates to an improved reel for fence-wire and similar material, and has for its object to provide a simple and durable device capable of convenient and expeditious attachment to a wagon or like vehicle, and also to provide for the revolution of the reel shaft or shafts from the wheels of the vehicle.

A further object of the invention is to construct the device so that the wire may be wound upon the reels or unwound therefrom, as may be desired, as the vehicle is drawn forward, thus enabling a line or lines of fence-wire to be laid in proper position or removed from any inclosure and reeled without the necessity of the operator's handling the wire or leaving the vehicle.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
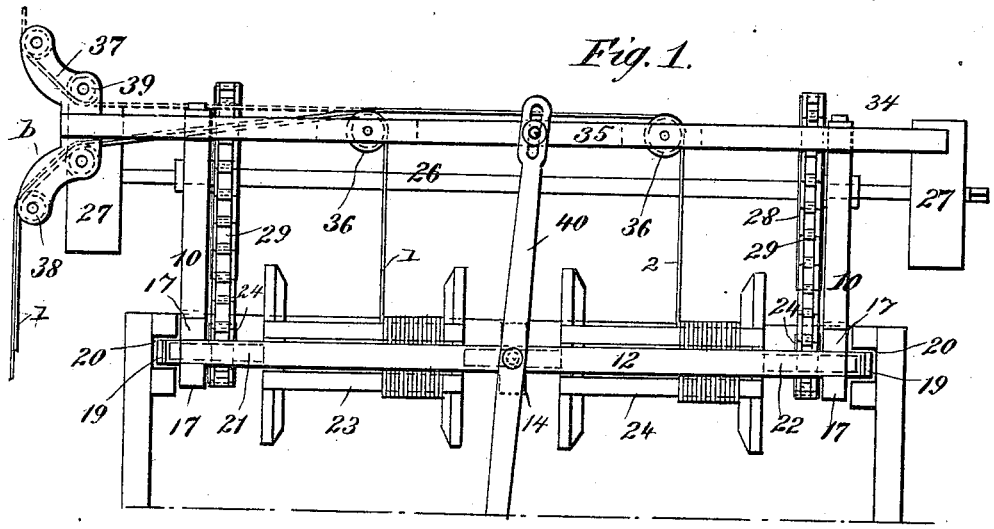
Figure 2:
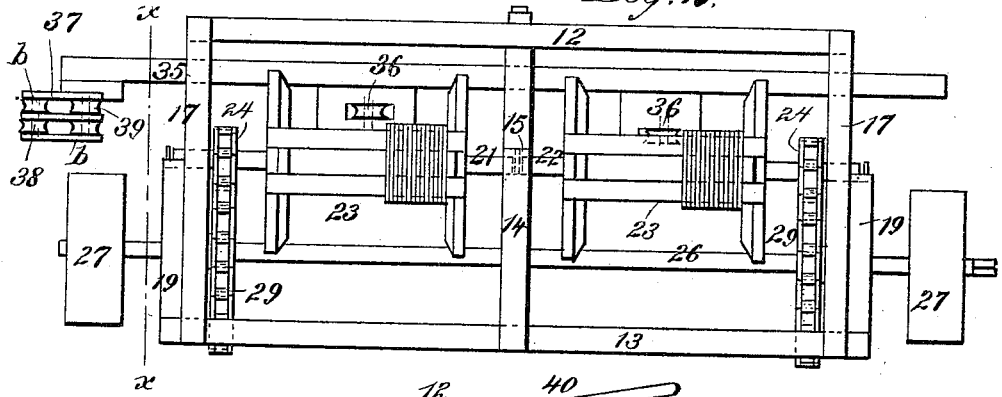
Figure 3:
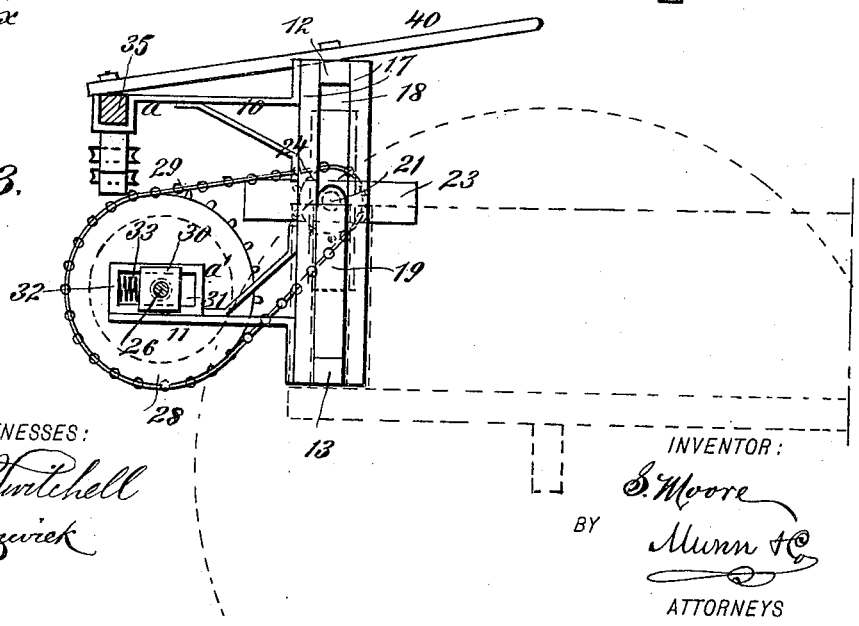

Figure 1 is a plan view of the device represented as attached to a vehicle. Fig. 2 is a rear elevation of the device detached from a wagon; and Fig. 3 is a section on line $x$ $x$ of Fig. 2, illustrating a portion of a wagon-body and one of the rear wheels in dotted lines.

The frame of the device consists of the top and bottom longitudinal bars 12 and 13, which are connected at the ends on each side by vertical uprights 17 and are braced by a central upright 14, the upper portion of which at its rear side is cut away, forming a shoulder 15, as shown in Fig. 2. From the forward side of each forward end upright 17 project the brackets 10 and 11, the brackets 10 having formed at their outer ends the boxes $a$ and the brackets 11, carrying the boxes $a'$. Between the uprights 17 at each end is a space 18, and in the lower portion of said spaces cleats 19 are located, which cleats project beyond the outer side of the uprights 17, being adapted to constitute tongues to enter the slideways 20 of the wagon, in which slideways the tail-board is usually held. The upper ends of the cleats 19 are concaved to form journal-boxes, and the shoulder 15 of the central upright 14 is recessed in like manner to constitute a central box or bearing. Ordinarily two reel-shafts 21 and 22 are employed, the shaft 21 being journaled at one extremity in the left-hand cleat and in the box of the central upright 14 and the other shaft 22 at one extremity in the box of the right-hand cleat 19 and at its opposite end in the box of the central upright 14, as is best shown in Fig. 2. Upon each of these shafts, which are independent one of the other, a reel 23, of any suitable form, is firmly yet detachably mounted, and each shaft 21 and 22 near its outer end is provided with an attached sprocket-wheel 24.

In the boxes $a'$ of the lower brackets 11 the drive-shaft 26 is journaled, which drive-shaft extends beyond the sides of the device and is provided at each extremity with a fixed friction-wheel 27, and at or near the inner face of each bracket 11 a large sprocket-wheel 28 is preferably secured, which sprocket-wheels are connected by chain belts 29 with the small sprocket-wheels 24 upon the reel-shafts. The drive-shaft 26 is mounted to revolve in sliding boxes 30, which boxes are held to move in the longitudinal slots 31 of the boxes $a'$ of the brackets 11, and a spring 33 is interposed between the inner face of the end 32 of each of the boxes $a'$ and the opposed face of the box 30 adjacent thereto, the purpose of the said springs 33 being to keep the friction-wheels 27 of the drive-shaft continually in contact with the periphery of the rear wheels of the vehicle-body, to which the device is applied.

In the boxes $a$ of the upper bracket-arms a spooling-bar 35 is held to slide, and the said spooling-bar may be reversed to receive a wire from either side of the wagon, as desired. The spooling-bar between the side pieces has attached to its under face the casings of two horizontally-located guide-rollers 36, one guide-roller being located opposite each of the reels 23, and upon one outer end of the spooling-bar an essentially U-shaped horizontally-disposed frame 37 is attached, one member of which frame projects outward beyond each side of the said bar, as best shown in Fig. 1.

The frame 37 is preferably made up of two or more, preferably three, spaced plates b of the same shape as illustrated in Fig. 2, and between said plates at the outer ends of their members friction or guide rollers 38 are pivoted, and at the intersection of each member with the body or bow portion of the frame similar rollers 39 are pivoted.

The spooling-bar is laterally reciprocated through the medium of a lever 40, fulcrumed upon the upper longitudinal bar 12 of the device, and the outer end of the said lever is attached to the central portion of the spooling-bar, as best shown in Fig. 1.

In operation, when the device is located, as heretofore described, at the rear end of the wagon-body, the friction-wheels 27 of the drive-shaft come in contact with the rear wheels of the vehicle. If the wire of the fence is to be taken down and removed, one end of the upper wire 1, for instance, is passed over the upper rollers of the forwardly-projecting member of the U-shaped frame to a connection with the left-hand reel and the lower wire 2 over the lower rollers 39 of the said member of the U-frame to a connection with the right-hand reel. The wires, before being attached to the reels, are passed around the guide-pulleys 36, as illustrated in Fig. 1. Thus as the vehicle is drawn forward the drive-shaft is revolved and motion is communicated thereby to the reel-shafts, and as the reels are revolved the wire is wound up thereon, the lever 40 being manipulated to laterally reciprocate the spooling-bar, thereby causing the wire to wind smoothly upon and from end to end of the reel. When the reels mounted upon the shafts 21 and 22 have been filled, they may be removed from said shafts and placed in the wagon and empty reels may be substituted.

When it is desired to unreel wire for purposes of constructing a fence, the belts 29 will be thrown off from the sprockets 24 of the reel-shafts, whereupon, when one end of the roll is fastened to a stick or other suitable object, the wire will rapidly pass off the the reel and be laid upon the proposed line of fence as the vehicle is drawn forward, and when one reel has been emptied it may be removed and a full reel substituted, as a number of reels may be carried in the vehicle without inconvenience or interfering with the operation of the device. If desired, one wire may be taken up and the other let out at the same time, in which event one of the belts 29—for instance, the right-hand one—is thrown off and the wire which is to be let out is passed over one of the rollers of the rearwardly-projecting member of the U-shaped frame 37, as shown in dotted lines, Fig. 1. Now when the vehicle moves forward, the left-hand reel will be positively driven to take up its wire, and the right-hand reel, being disengaged from the driving-shaft, will be free to rotate to let out the wire.

It will be observed that by reason of the construction of the device the necessity of lifting heavy reels a great distance to and from the wagon is avoided, and also the manipulation of the wire by hand, and that a fence may be taken down from one inclosure and carried quite a distance and expeditiously set up at another place without at all inconveniencing the operator, though the ground be very moist.

In building the fence, as the vehicle is drawn forward and the wire unreeled, it may be tacked to the posts or other uprights placed to receive it.

I desire it to be distinctly understood that, while a specific construction has been shown and described, equivalent constructions may be employed without departing from the spirit of the invention.

Having thus described my invention, I claim as new and desire to secure by Letters Patent—

1. The combination, with a frame adapted to be supported on a vehicle-body, of two reel-shafts independently mounted in the frame and each provided with a sprocket-wheel, a drive-shaft mounted in the frame and provided with sprocket-wheels, and chain belts connecting the said sprocket-wheels, substantially as described.

2. The combination, with a supporting-frame and reels mounted therein, of a transversely-sliding spooling-bar provided with a guide-pulley opposite each reel, a frame on one end of the said bar and carrying guide-pulleys, and a lever for operating said bar, substantially as described.

3. The combination, with a wagon-body and a frame detachably attached thereto, removable reel-shafts journaled in the said frame, a drive-shaft also journaled in the frame, and a connection between the drive-shaft and reel-shafts, of reels detachably secured to the reel-shafts, friction-wheels attached to the drive-shaft and adapted for engagement with the periphery of the vehicle-wheels, and a laterally-reciprocating spooling-bar provided with a series of guide-rollers, substantially as shown and described, and for the purpose specified.

4. The combination, with a frame, detachable shafts journaled therein, and reels detachably secured to the said shafts, of a drive-shaft, a connection between the said drive-shaft and the reel-shafts, friction-wheels secured to the extremities of the drive-shaft, a spooling-bar held to reciprocate laterally within the frame in front of the reels, pulleys carried by said spooling-bar and adapted to guide the wire to the reels, and a lever fulcrumed upon the frame and attached at one end to the spooling-bar, as and for the purpose specified.

SYLVESTER MOORE.

Witnesses:
THEODORE F. MORROW,
L. P. KESSLER.